US009374655B1

(12) United States Patent
Lee et al.

(10) Patent No.: US 9,374,655 B1
(45) Date of Patent: Jun. 21, 2016

(54) MANAGING A TRANSMISSION POWER LEVEL

(75) Inventors: Allen Lee, Los Altos, CA (US); Nadim Awad, San Francisco, CA (US); Ruenjou Lu, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 494 days.

(21) Appl. No.: 13/526,204

(22) Filed: Jun. 18, 2012

(51) Int. Cl.
*H04W 24/00* (2009.01)
*H04W 52/04* (2009.01)
*H04W 4/00* (2009.01)

(52) U.S. Cl.
CPC .................................... *H04W 4/008* (2013.01)

(58) Field of Classification Search
CPC ........ H04W 24/00; H04W 52/04; H04B 1/38; H04B 1/04; H04M 1/00
See application file for complete search history.

(56) References Cited

U.S. PATENT DOCUMENTS

| 2006/0133332 A1* | 6/2006 | Achanta | H04W 24/02 370/338 |
| 2009/0305742 A1* | 12/2009 | Caballero | H04B 1/3838 455/566 |
| 2012/0021800 A1* | 1/2012 | Wilson | H04W 52/146 455/550.1 |
| 2012/0257657 A1* | 10/2012 | Subrahmanya | H01Q 1/245 375/222 |

\* cited by examiner

*Primary Examiner* — Edward Urban
*Assistant Examiner* — Ralph H Justus
(74) *Attorney, Agent, or Firm* — Lee & Hayes, PLLC (57) ABSTRACT

A user device may include a transmission power manager to control a transmission power level of a wireless transceiver based on a location of a human body proximate the user device as detected by a proximity sensor. In response to at least one of a power up of the user device or initialization of a wireless transceiver, the transmission power manager may restrict a transmission power level of the wireless transceiver to one of a plurality of power states. The transmission power manager may then operate to detect a step in proximity sensor data obtained by the proximity sensor. Then, in response to detecting the step in the proximity data, the transmission power manager may restricting the transmission power level of the wireless transceiver and determine a proximity threshold value based at least in part on the detected step and the proximity sensor data.

30 Claims, 9 Drawing Sheets

MANAGING A TRANSMISSION POWER LEVEL

BACKGROUND

Computing devices have become commonplace in almost every environment. For example, mobile telephones, laptop computers, and tablet computers are commonly used for work and pleasure, and accompany people in many daily activities. Further, people often travel with computers and mobile phones, bring these devices to school, and use these devices in public places. These electronic devices wirelessly communicate with a communications infrastructure to enable the consumption of digital media items, such as documents, images, music, and videos. Typically, a communications infrastructure specifies transmission power levels for the electronic devices to use when transmitting data to the communications infrastructure, rather than having the electronic devices make their own determinations regarding what transmission power levels to use.

Some bodies of research suggest that radiation absorption by the human body is undesirable and should be minimized when possible. For example, electronic devices may throttle a transmission power of a transceiver during wireless transmission of data in some situations. The United States Federal Communications Commission (FCC) specifies a specific absorption rate (SAR) of maximum radiation exposure allowed from electronic devices that operate in contact with a human body or very near a human body. Electronic devices must meet the FCC specifications while ideally allowing for the maximum transmission power level to be used when outside of the FCC threshold zones near human bodies.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A user device may be capable of transmitting data using one or more wireless transceivers, such as a Wi-Fi transceiver, mobile telephone communication transceiver, Bluetooth® transceiver, or other wireless protocol transceivers, transmitters, and/or receivers. The user device may include a proximity sensor to sense a location of a human body proximate the user device or proximate a portion of the user device (e.g., near an antenna). In addition, the user device may include a transmission power manager that may control a transmission power level of the wireless transceivers based at least in part on information from the proximity sensor.

For example, a user device may transmit data at a first transmission power level. The user device may then detect, using the proximity sensor, a presence of a human body part within a predetermined distance from an antenna of the user device using one or more sensors disposed on and/or within the user device. In response to the detection of the presence of the human body part, the user device may transmit information at a second transmission power level that is less than the first transmission power level. The second transmission power level may be determined using a transmission power manager, which may determine the second transmission power level based at least in part on previously used transmission power levels.

During operation of the wireless transceiver(s), the user device may record proximity data using the proximity sensors. The transmission power manager may perform an analysis of the proximity data to determine whether a human body is within a threshold distance from the proximity sensor(s). In some implementations, the proximity sensors may measure capacitance to determine the proximity of the user device to a human body. However, capacitance may vary based on environmental conditions, such as changes in temperature, air density, salt concentration, or other factors that modify measured capacitance. Thus, when a user device is moved to a new location or environment, the user device may need to be recalibrated to obtain capacitance data that enable the proximity sensor to accurately identify a location of a human body within the threshold distance.

Illustrative Environment and User Device

Figure 1:
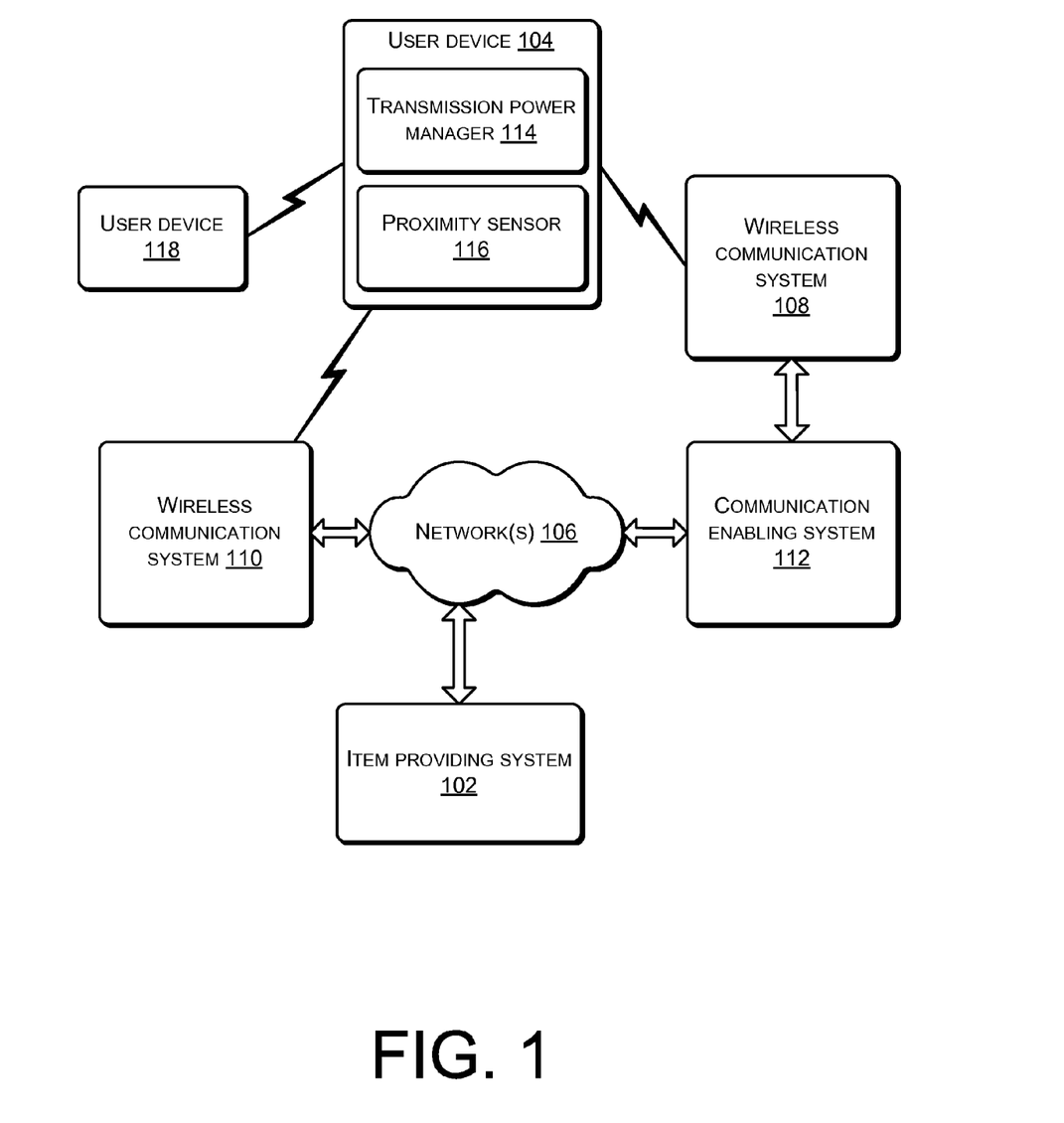
FIG. 1 is a schematic diagram of an illustrative computing architecture.

FIG. 1 is a schematic diagram of an illustrative computing architecture 100. The computing architecture 100 may include an item providing system 102 and one or more user devices 104 capable of communicating with the item providing system 102 via a network 106 (e.g., public network such as the Internet or private network such as a local area network (LAN)).

The user devices 104 may be variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book (eBook) reader devices, portable digital assistants, mobile phones, laptop computers, portable media players, tablet computers, cameras, video cameras, netbooks, notebooks, desktop computers, gaming devices or consoles, DVD players, media centers, and any other device equipped with a wireless transceiver.

The item providing system 102 and the user devices 104 deliver and/or receive items, upgrades, and/or other information via the network 106. For example, the user devices 104 may download or receive items from the item providing system 102. The item providing system 102 also receives various requests, instructions and other data from the user devices 104 via the network 106. The item providing system 102 may include one or more machines (e.g., one or more server computer systems, routers, gateways, etc.) that have processing and storage capabilities to provide the above functionality.

Communication between the item providing system 102 and the user device 104 may be enabled via any communication infrastructure. One example of such an infrastructure includes a combination of a wide area network (WAN) and wireless infrastructure, which allows a user to use the user device 104 to purchase items and consume items without being tethered to the item providing system 102 via hardwired links. The wireless infrastructure may be provided by one or multiple wireless communications systems, such as wireless communication system 108 and wireless communication system 110. One of the wireless communication systems 108, 110 may be a wireless fidelity (Wi-Fi) hotspot connected with the network 106. Another of the wireless communication systems 108, 110 may be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 112 that serves as an intermediary in passing information between the item providing system 102 and the wireless communication system 108. The communication-enabling system 112 may communicate with the wireless communication system 108 (e.g., a wireless carrier) via a dedicated channel, and may communicate with the item providing system 102 via a non-dedicated communication mechanism, e.g., a public Wide Area Network (WAN) such as the Internet.

In some implementations, while the user device 104 is connected with the wireless communication system 108 and/or wireless communication system 110, the transmission power levels used by the user device 104 for transmissions to that wireless communication system 108, 110 are based on values previously stored by the user device 104. In other implementations, while the user device 104 is connected with the wireless communication system 108 and/or wireless communication system 110, one or both of the wireless communication systems periodically or continuously specifies transmission power levels for the user device 104 to use for transmissions to that wireless communication system 108, 110. For example, conventional wireless carrier systems dictate what transmission power levels mobile phones are to use for communications with the wireless carrier systems. The transmission power levels that the wireless carrier systems specify continuously vary based on environmental factors such as a current signal to noise ratio, distance between the mobile phone and a nearest cell tower, obstacles between the mobile phone and the nearest cell tower, and so on. Unfortunately, wireless communication systems 108, 110 typically consider only signal strength when specifying what transmission power levels the user device is to use in transmissions of data. Wireless communication systems 108, 110 typically do not take into consideration radiation emitted by the user device 104 that may be absorbed by users of the user device 104, interference with other wireless connections, battery life of the user device 104, or other factors that may also be important to a user when specifying transmission power levels. Previously stored values have similar drawbacks. The user device 104 may have additional information that is not available to either an entity determining the previously stored values or the wireless communication systems 108, 110. This additional information may be used to help determine what transmission power levels to use.

The user device 104 disclosed herein may control the transmission power levels of the user device independent of the wireless communication systems 108, 110. Alternatively or additionally, the user device 104 disclosed herein may control the transmission power levels of the user device by refining the specified transmission power levels dictated by an entity determining the previously stored values. In one implementation, the user device 104 includes a transmission power manager 114 that receives a specified transmission power level from the wireless communication system 108 and performs an analysis of what transmission power levels to use for the transmission of data to the wireless communication system 108. In one implementation, the transmission power manager 114 uses the specified transmission power level as an upper threshold, and determines whether a transmission power level that is lower than the specified transmission power level should be used based at least in part on data collected by a proximity sensor 116. However, implementations may determine the transmission power level independently.

In addition to wirelessly connecting to a wireless communication system 108, 110, the user device 104 may also wirelessly connect with other user devices (e.g., user device 118). For example, user device 104 may form a wireless ad hoc (peer-to-peer) network with user device 118. In addition to controlling the transmission power levels used to communicate with the wireless communication systems 108, 110, the transmission power manager 114 may also control the transmission power used to communicate with other user devices 118.

Although the preceding and following discussion refers to "transmitting" and "transmission," which may be implemented by a transceiver or a transmitter, implementations may also cover operations of receivers, where appropriate.

Figure 2:
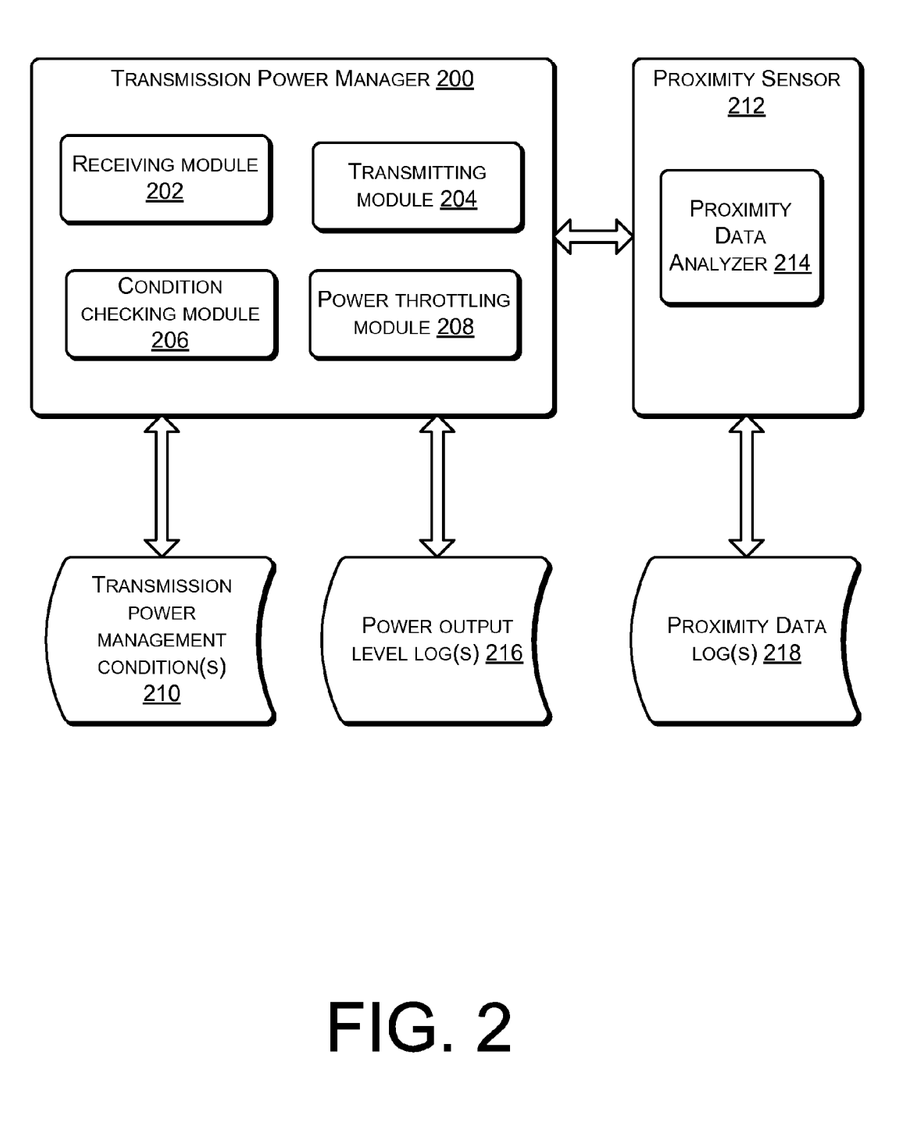
FIG. 2 is a block diagram of an illustrative transmission power manager.

FIG. 2 is a block diagram an illustrative transmission power manager 200, which may correspond to the transmission power manager 114 of FIG. 1. In some implementations, the transmission power manager 200 includes a receiving module 202, a transmitting module 204, a condition checking module 206, and a power throttling module 208.

The receiving module 202 may receive commands to transmit data, which may identify specified transmission power levels to use for data transmission. The commands may specify explicit transmission power levels to use (e.g., may specify that a transmission power level of +50 dbm is to be used), or may specify a current transmission power level relative to a previously used transmission power level (e.g., an increase of 1 dbm or a decrease of 2 dbm). Commands may also indicate that a previously specified transmission power level should be used. Commands may originate from the wireless communication system 108, and may be routed to the transmission power manager 200 by a wireless transceiver and/or processor of the user device 104. These commands may also be received from other sources, such as applications running on the user device 104.

The condition checking module 206 may determine whether any transmission power management conditions 210 apply to forthcoming transmissions. For example, the transmission power management conditions 210 may apply to data received from the proximity sensor 212, which may correspond to the proximity sensor 116 of FIG. 1. The proximity sensor 212 may record proximity data, such as capacitance values sensed by one or more sensors and then analyzed by a proximity data analyzer 214. The transmission power management conditions 210 may include proximity conditions associated with the proximity data output by the proximity data analyzer 214. In some implementations, transmission power management conditions 210 may also include communications interference conditions, battery level conditions, power consumption conditions, and so on. The transmission power management conditions 210 may apply to communications via a particular wireless communication protocol, with a particular wireless communication system, associated with a particular application, etc. Some transmission power management conditions 210 may apply to multiple wireless protocols, wireless communications systems, applications, etc. For those transmission power management conditions 210 that apply to a current transmission, condition checking module 206 determines whether the conditions will be violated by the current transmission. For example, condition checking module 206 may determine whether transmission power management conditions will be violated by transmitting data at the specified transmission power level.

In various implementations, the transmission power management conditions 210 include a human body part proximity condition based on the proximity data output by the proximity data analyzer 214. This condition may be violated (or alternatively satisfied) when a human body part is detected, or when it is determined that a human body part is closer than a threshold distance from the user device 104 or from an antenna of the user device. In some implementations, the functions of the condition checking module 206 may be incorporated into the proximity sensor 212 or the proximity data analyzer 214. In other words, the detection/determination of the presence of a human body part (or at least a proximity sensor reading that indicates such a presence), may be performed by the proximity data analyzer 214 of the proximity sensor 212 or may be performed by the transmission power manager 200 based on raw sensor data from the proximity sensor 212, or both. Similarly, the functions of the proximity data analyzer 214 may be incorporated into the transmission power manager 200 or the condition checking module 206.

The transmission power management conditions 210 may be stored in volatile or nonvolatile memory of the user device 104 or other computer-readable media. In at least one implementation, the power management conditions 210 are hard coded into the user device, and cannot be modified. Alternatively, the transmission power management conditions 210 may be updated by modifying existing power management conditions, adding new power management conditions, or deleting existing power management conditions.

In some implementations, the condition checking module 206 maintains a transmission power level log 216 associated with transmission power levels of a particular antenna (or radio). In another implementation, the condition checking module 206 maintains a transmission power level log 216 associated with transmission power levels of all antennas of the user device. Alternatively, the condition checking module 206 may maintain separate transmission power level logs for each antenna. The transmission power level log or logs 216 are records of past transmission power levels that have been used (e.g., in a defined sample period). The sample period may be, for example, 5 seconds, 10 seconds, 1 minute, 10 minutes, and so forth. For some power management conditions 210, such as a proximity sensor threshold reset condition (discussed with regard to FIGS. 8 and 9 below), the transmission power level log 216 is used to determine whether the power management condition 210 has been met or violated.

In various implementations, the proximity data analyzer 214 may maintain a proximity data log 218 associated with proximity data of the proximity sensor 212. The proximity data log 218 may store data associated with various operating states, such as proximity data associated with proximity values when the antenna and/or the user device 104 are within a threshold distance from a human body and/or other ranges (or zones) from a human body. The proximity values may be capacitance values for different operating modes (e.g., a threshold for a low transmission power mode, a threshold for a high transmission power mode, etc.). In addition, the proximity data log 218 may store default proximity threshold data, which may be associated with the various operating states. The default proximity data may be used in place of the stored data when no stored data is present (e.g., first use of the device), or the currently measured proximity data is statistically different than the stored proximity data (e.g., device is moved to a new location or environment that affects measured capacitance).

Throughout this specification, the term "threshold" is used as a broad term for the value at which the proximity sensor reading indicates, for example, the proximity of a human body part, without indicating a specific type of measurement, a type of units, a measurement scale, etc. For example, as used herein, the term "threshold" encompasses a threshold value expressed as a raw sensor data value that would be output by the proximity sensor 212, a capacitance value derived from the raw sensor output, as well as a threshold value expressed as a distance from the user device 104 or from an antenna of the user device.

Power throttling module 208 may reduce a transmission power level used to transmit data to the wireless carrier system when one or more transmission power management conditions 210 have been violated (e.g., human body is within the threshold distance, etc.). The power throttling module 208 may reduce the transmission power level below a specified transmission power level incrementally. For example, the power throttling module may reduce the transmission power level in 1 db increments until a suitable transmission power level is reached. In one implementation, a suitable transmission power level is an output level that will not cause any of the transmission power management conditions to be violated. Alternatively, a suitable transmission power level may be a level that will cause the transmission power management condition to stop being violated at some point in the future. For example, a suitable transmission power level may cause a trend towards eventual compliance with the violated transmission power management conditions 210.

Alternatively, the power throttling module 208 may compute or otherwise identify a suitable transmission power level, and reduce the current transmission power level to the suitable transmission power level in a single action. For example, a transmission power management condition 210 may specify that when the condition is violated, the transmission power level may be reduced to a predetermined transmission power level. In another implementation, power throttling module 208 may compute a suitable transmission power level based on proximity data instead of using a predetermined transmission power level.

Power throttling module 208 may reduce a duty cycle for the transmissions (e.g., space out the transmissions over time). Therefore, the power throttling module may adjust both the transmission instantaneous power output used for transmission and the frequency of those transmissions.

Transmitting module 204 transmits data to a wireless communication system or additional user device at either a specified transmission power level (e.g., as specified by the wireless communication system) or at a transmission power level determined by the power throttling module 208. The transmitting module 204 may transmit the data through one or more antennas included in the user device.

Figure 3:
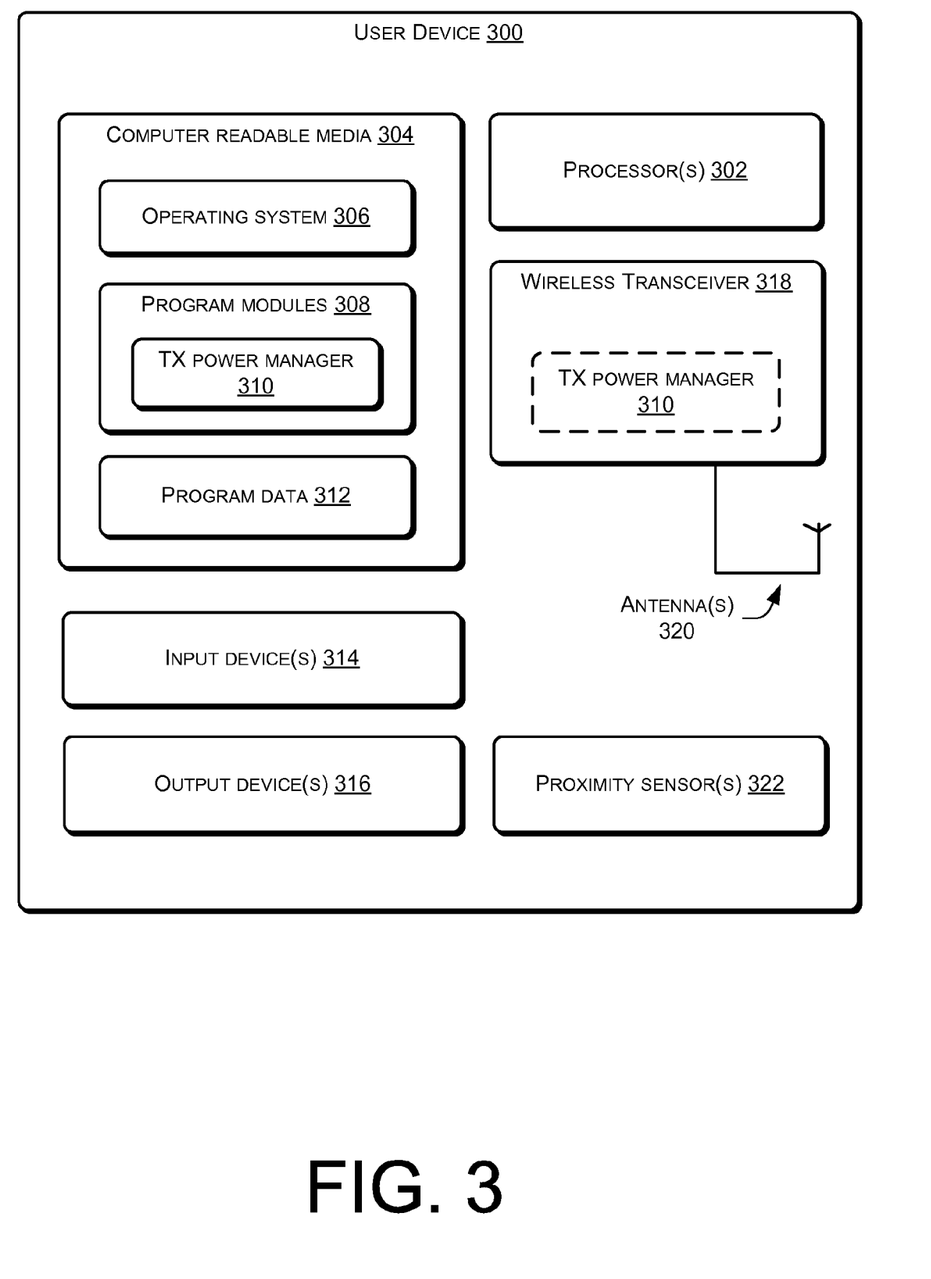
FIG. 3 is a block diagram of an illustrative user device.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming device or console, a DVD player, a media center, and any other device that includes a wireless transceiver.

The user device 300 includes one or more processors 302, such as one or more CPUs, microcontrollers, field programmable gate arrays, or other types of processors. The user device 300 also includes computer-readable media 304, which may correspond to any combination of volatile and/or non-volatile storage mechanisms. The computer-readable media 304 stores information which provides an operating system component 306, various program modules 308 such as transmit (TX) power manager 310, program data 312, and/or other components. The user device 300 performs functions by using the processor(s) 302 to execute instructions provided by the computer-readable media 304. Depending on the configuration of the user device 300, the computer-readable media 304 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, and/or any other medium that can be used to store information and which can be accessed by the processor 302 directly or through another computing device. Accordingly, the computer-readable media 304 may be computer-readable storage media able to maintain instructions, modules or components that are executable by the processor 302. Instructions for the transmission power manager 310 may reside, completely or at least partially, within the computer-readable media 304 and/or within the processor(s) 302 during execution thereof by the user device 300, the computer-readable media 304 and the processor(s) 302 also constituting computer-readable storage media.

The user device 300 may also include one or more input devices 314 (keyboard, mouse device, specialized selection keys, etc.) and one or more output devices 316 (displays, printers, audio output mechanisms, etc.). In some implementations, the input devices 314 and/or the output devices 316 may be accessories that may alter capacitance measured by the proximity sensor. This is discussed in further detail with reference to FIG. 9.

The user device 300 further includes a wireless transceiver 318 to allow the user device 300 to communicate via a wireless network (e.g., such as provided by the wireless communication system) with other computing devices, such as remote computers, the item providing system, and so forth. The wireless transceiver 318 allows the user device 300 to handle both voice and non-voice communications (such as communications for text messages, multimedia messages, media downloads, web browsing, etc.) with the wireless communication system 108. The wireless transceiver 318 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), Wi-Fi, etc. In one implementation, the wireless transceiver includes the transmission power manager 310 in addition to, or instead of, the transmission power manager 310 being included in the computer-readable media 304 and/or processor(s) 302. The transmission power manager 310 may be implemented as hardware, firmware and/or software of the wireless transceiver 318.

The wireless transceiver 318 may generate signals, after which they are wirelessly transmitted via the antenna(s) 320, respectively. If multiple antennas 320 are included, the antenna(s) 320 may be configured to transmit in different frequency bands and/or using different wireless communication protocols. The antenna(s) 320 may be directional, omnidirectional or non-directional antennas. In addition to sending data, the antenna(s) 320 also receive data, which is sent to wireless transceiver 318 and transferred to processor(s) 302.

Although a single wireless transceiver 318 is shown to control transmission to antenna(s) 320, the user device 300 may alternatively include multiple wireless transceivers, each of which is configured to transmit data via a different antenna and/or wireless transmission protocol. In one implementation, each wireless transceiver includes an independent transmission power manager 310. Alternatively, a single transmission power manager 310 (e.g., that is included in computer-readable media 304) may control transmission power levels used by each wireless transceiver.

In some implementations, user device 300 includes one or more proximity sensors 322. The proximity sensors 322 can detect the presence of human body parts, and convey information regarding the detected presence to processor(s) 302. In various implementations, the proximity sensors 322 may be capacitive sensors that are configured to measure capacitance generated by the presence of the human body part (or, depending on the implementation, other conductive objects) using any one of various techniques known in the art, for example, relaxation oscillation, a current verses voltage phase shift comparison, resistor-capacitor charge timing, capacitive bridge division, charge transfer, sigma-delta modulation, or charge-accumulation.

The proximity sensors 322 may also be other types of sensors. For example, the proximity sensors 322 may be optical (e.g., infrared) sensors that use an emitter and receiver pair to detect the presence of opaque objects. Alternatively, the proximity sensors 322 may be inductive sensors, which include an inductive loop. When the presence of a human body part (or other conductive object) is brought close to the inductive sensor, an induction of the inductive loop changes, causing the human body part to be detected. Alternatively, the proximity sensors 322 may be ultrasonic sensors that emit an ultrasonic signal and measure a time duration between when a signal is transmitted and the reflection of that signal received (a.k.a., flight response). The proximity sensors 322 may also include other types of sensors, such as those that operate using the detection principles of resistive (e.g., analog resistive, digital resistive or residual resistive), surface acoustic wave, electromagnetic, near field imaging, or other technologies. In one implementation, multiple different types of sensors are used. Though the detected object is described herein as a human body part, other types of objects may also be detected depending on the sensing technologies used.

In some implementations, the proximity sensors 322 includes part or all of the transmission power manager 310 (not shown) in addition to, or instead of, the transmission power manager 310 being included in the computer readable storage medium 304 and/or the wireless transceiver 318. The transmission power manager 310 may be implemented as hardware, firmware and/or software of the proximity sensors 322.

In some implementations, the processor(s) 302 may execute sensor control instructions (e.g., sensor device drivers) that enable the processor(s) 302 to interpret signals received from the proximity sensor(s) 322. In one implementation, the proximity sensors 322 output fully processed signals to the wireless transceiver 318 which in turn may use the signals or forward the processed signals to the processor(s) 302 if the processor(s) 302 execute instructions of the transmission power manager 310. For example, the proximity sensors 322 may output data based on capacitance, a distance, a detected/not detected signal, etc. using a single line interface or a multi-line interface. In another implementation, the proximity sensors 322 output, for example, positional data and/or object presence data (e.g., of a human body part) to the wireless transceiver 318 and/or processors 302 without first processing the data. In either instance, the processors 302 may use the sensor control instructions to process and/or interpret the received data. If data is received from more than one proximity sensor 322, processing the data may include averaging the data, identifying a maximum from the data, or otherwise combining the data from the multiple sensors. In one implementation in which the sensors 322 include a sensor array, numerous sensors, or a touch panel, processing the data includes determining where on the user device the human body part is located from multiple sensor readings. In other implementations, the antenna 320 may be used as a proximity sensor (e.g., as a sensor electrode for a proximity sensor).

Figure 4:
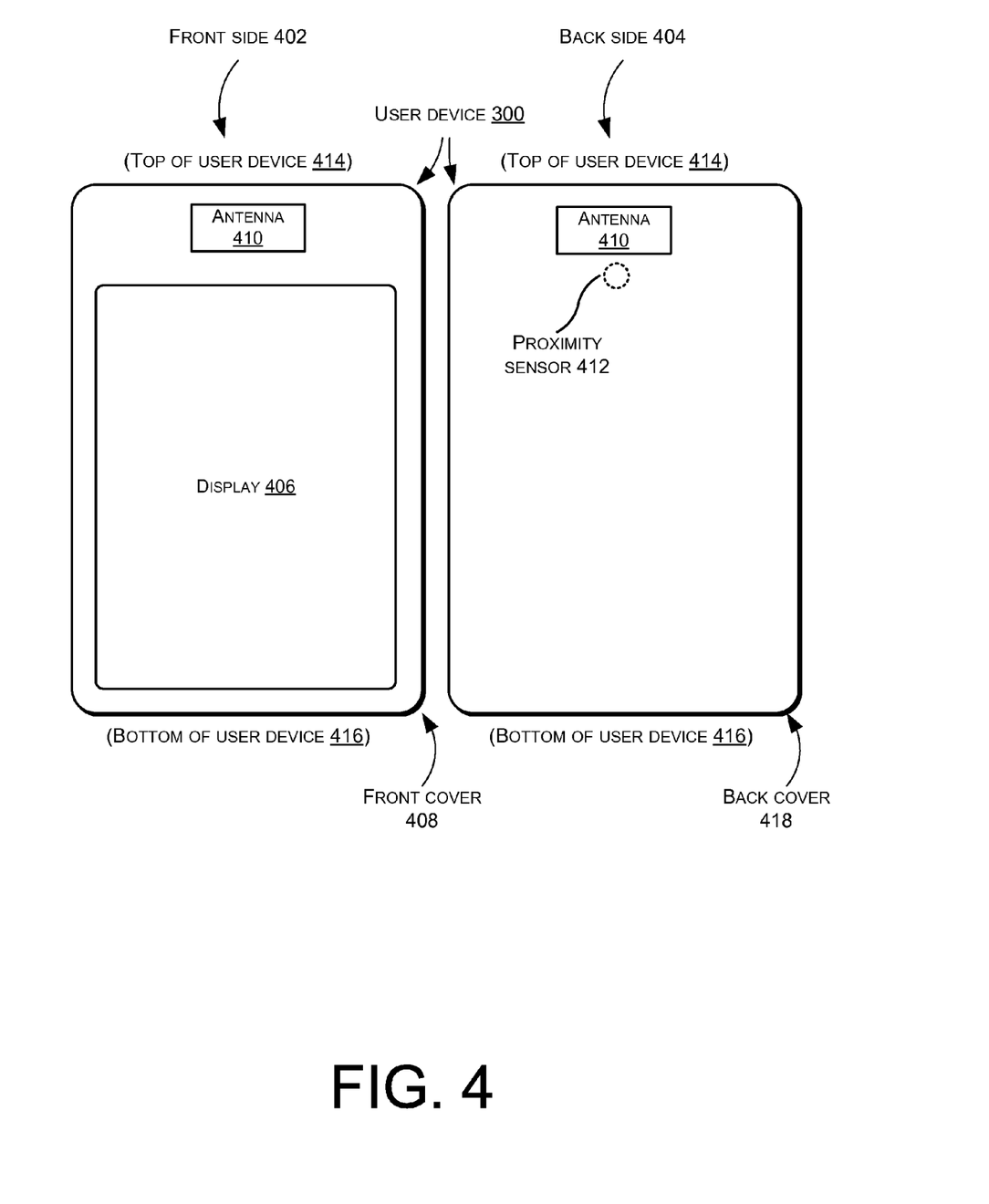
FIG. 4 is a schematic diagram of a front side and a back side of the user device.

FIG. 4 is a schematic diagram of a front side 402 and a back side 404 of the user device 300. A front side 402 includes a display 406. The display 406 may use any available display technology, such as electronic ink (e-ink), liquid crystal display (LCD), transflective LCD, light emitting diodes (LED), laser phosphor displays (LSP), and so forth. In some implementation, the display 406 and an input are combined into one or more touch screens. Optionally, the user device may include an input housed in a front cover 408. The input may include a keyboard, touch pad, or other input mechanism.

Disposed inside the user device 300 are an antenna 410 and at least one proximity sensor 412. As shown, the antenna 410 is positioned near a top 414 of the user device. However, the antenna 410 may also be positioned at other locations, such as at a side of the user device 300 or near the bottom 418 of the user device 300.

Disposed at a back side of the user device 300 are the at least one proximity sensor 412. The proximity sensor 412 may correspond to the proximity sensor(s) 322 that were described with reference to FIG. 3. The proximity sensor(s) 412 may be capacitive sensors, inductive sensors, magnetic sensors, infrared sensors, ultrasonic sensors, or the like. The sensors 412 may also be touch sensors such as a resistive touch sensor, a capacitive touch sensor, a mechanical touch sensor (e.g., a mechanical button), or the like.

The antenna 410 and the proximity sensor 412 are shown in the illustrated implementation using dashed lines to indicate that these components are not on a surface of the user device 300 (e.g., that they are inside a back cover 418). However, in alternative implementations these components may be on a surface of the user device 300.

Note that in one implementation the proximity sensor 412 is disposed proximate to the antenna 410 to detect when a human body part is close to the antenna 410. This may include detecting a distance between the antenna 410 and the human body part. In implementations including more than one proximity sensor 412, the proximity sensors 412 may be disposed in an approximately linear pattern. Alternatively, the sensors 412 may be disposed in other patterns at the back side 402 of the user device 300. Such additional patterns may include a rectangular pattern, an elliptical pattern, a checkerboard pattern, or other pattern. The proximity sensors 412 may be discrete sensors, or may be linear sensor arrays, other sensor arrays, a touch panel, slider sensors, or the like. In the case of a single proximity sensor 412, some implementations include a single proximity sensor that is substantially equal to the size of the entire back cover 418 of the user device 300. As shown, the proximity sensor 412 is disposed between the antenna 410 and the bottom 416 of the user device 300. However, the proximity sensors 414 may also be disposed at other locations with relation to the antenna 410, such as between the antenna 410 and the top 414 of the user device 300. Though the proximity sensors 412 are shown only at the back side 404 of the user device 300, the front side 402 of the user device 300 may also include other sensors. In one implementation, as described above with reference to FIG. 3, the antenna 410 itself acts as a proximity sensor.

Illustrative Process

Figure 5:
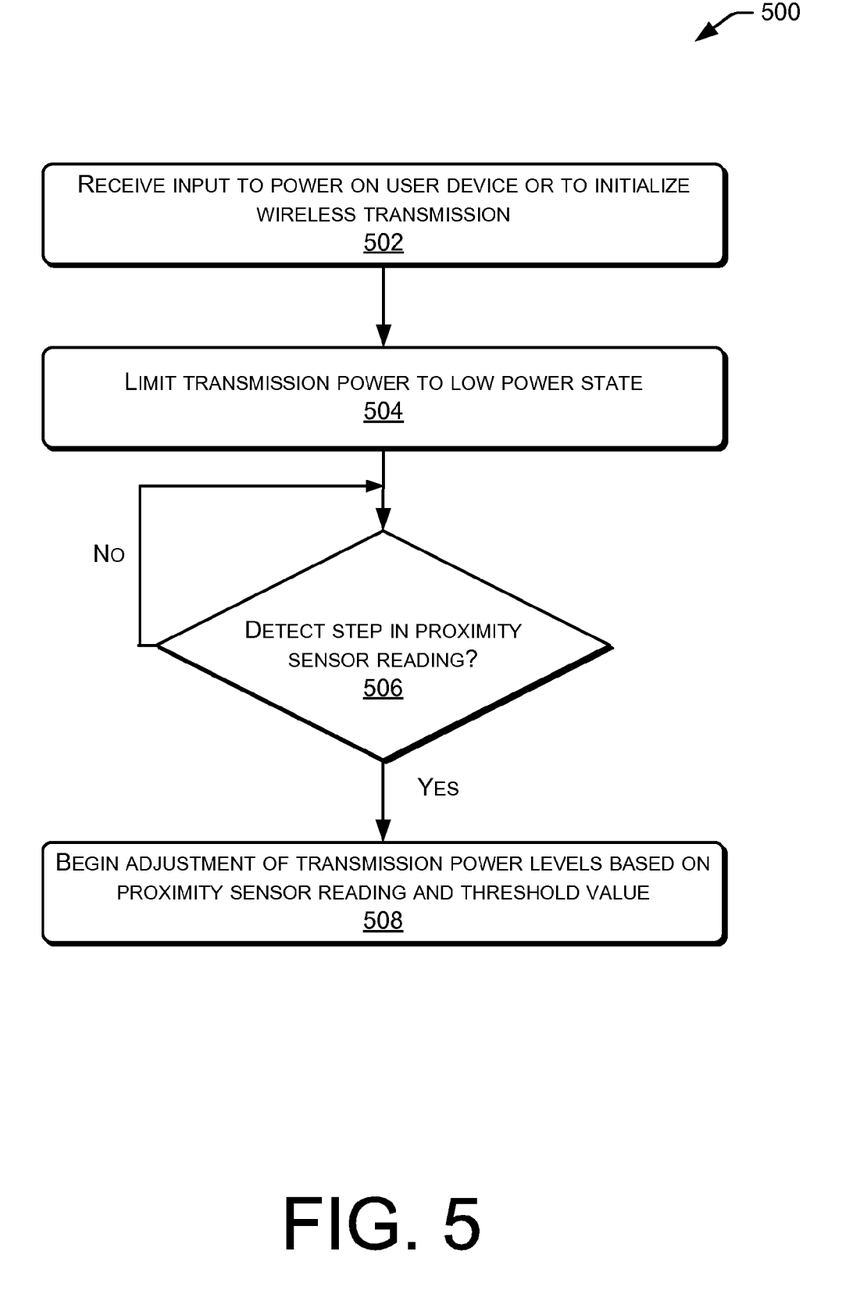
FIG. 5 is a flow diagram of an illustrative process for controlling a wireless transceiver power level at device power on or wireless transmission initialization.

FIG. 5 is a flow diagram of an illustrative process 500 that shows the initialization of the user device or, the initialization of wireless transmission, using the proximity sensor, in particular, to calibrate a proximity sensor based on various environmental conditions. The process 500 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure (e.g. FIG. 8), in addition to process 500, shall be interpreted accordingly.

The process 500 is described with reference to FIGS. 1-4 and may be performed by the user device 300. Of course, the process 500 (and other processes described herein) may be performed in other similar and/or different devices and/or in different environments.

At 502, the user device 300 receives a command to power on or to initialize wireless transmission by the user device 300. In the case of the latter, process 500 may or may not have been conducted at power on.

At 504, in response to the command to power on or to initialize wireless transmission by the user device 300, the user device 300 powers on (if necessary) and initializes the wireless transceiver 318. At the same time, the transmission power manager 310 operates to limit the transmission power level of the wireless transceiver 318 to a low power state without regard to current proximity sensor readings. In some implementations, this is done because, as discussed above, readings from proximity sensors, such as capacitive sensors, can be influenced by environmental conditions, such as changes in temperature, air density, salt concentration, or other factors that modify measured capacitance. Because the user device 300 may have been moved between locations with sufficiently different environmental conditions to cause the transmission power manager 310 to incorrectly interpret proximity sensor readings since the last time proximity sensor data thresholds were updated, were the device to immediately use a comparison of the current proximity sensor data to the possibly outdated thresholds, the resulting transmissions may be transmitted at a higher than allowable transmission power level. If this were to happen, the radiation absorbed by the user may exceed the maximum legal amount.

It should be noted that the terms "power level" and "power state" may be used in different contexts herein. Specifically, the term "power level," for example the transmission power level, is used to mean the power level at which signals are transmitted by a user device. This value could be represented in any number of ways including the maximum instantaneous power output or power output over a period of time which is dependent on both the duty cycle and the instantaneous power output. In some examples herein, the term "power state" is used herein to refer to an allowable power level. A power state may be set based on, among other factors, proximity data. Similar to the power level, the power state could be represented in any number of ways including the maximum instantaneous power output or power output over a period of time. In some examples, power level and power state may be used separately because, while the proximity data may be such that the power state is set to allow the transmission power level to be as high as possible, the transmission power level may be lower. For example, the transmission power level may be set at a lower value because the user device is very near the receiving device. Thus, while the power state is set to a high power state, the actual transmission power level used may be lower than that specified by the lowest power state. In short, the transmission power level may be affected by many portions of the user device including software, firmware or hardware. Further, while the power state could specify a specific duty cycle and instantaneous power output, it could also be, for example, an indication of only the maximum instantaneous power output or the maximum power output over a period of time.

At 506, the transmission power manager 310 monitors the proximity sensor readings, in this case, capacitance sensor data, to detect a step in the sensed capacitance. In other words, the transmission power manager 310 detects upward and/or downward changes in the sensor readings. Herein, an upward step or change in sensor readings is indicative of an increase in proximity or, in other words, an indication that a human body part has moved closer to the proximity sensor. Conversely, a downward step or change in sensor readings is indicative of a decrease in proximity or, in other words, an indication that a human body part has moved away from the proximity sensor. Upon detection of the step in the sensor readings, the transmission power manager 310 is able to more clearly establish whether or not the initial sensor readings were indicative of a human body part being in proximity to the antenna 320. For example, if there is a downward (negative) step in capacitance sensor data, the transmission power manager 310 can much more confidently establish that the initial readings are readings indicative of a human body part being in proximity to the antenna 320 and that the new, lower readings are indicative of readings in which the human body part is not in close proximity to the antenna 320 (i.e. the human body part has moved away). If there is a upward (positive) step in the capacitance sensor data, the transmission power manager 310 can much more confidently establish that the initial readings are indicative of readings in which the human body part is not in close proximity to the antenna 320 and that the new, higher readings are readings indicative of a human body part being in proximity to the antenna 320 (i.e. the human body part has into proximity). Some implementations monitor for only upward or downward steps in the proximity sensor readings. In other words, some implementations only detect downward (negative) steps in the proximity sensor readings for the purposes of block 506. As such, after initialization, the transmission power manager 310 would continue to limit the wireless transceiver 318 to a low transmission power state until a downward (negative) step in the capacitance sensor data is detected. Other implementations may only detect upward (positive) steps in a similar manner.

In some implementations, additional conditions are placed on the detected step. For example, in some implementations, the step may be at least of a predetermined magnitude in the raw sensor readings data before the step will be detected in block 506. Similarly, in some implementations the step may occur within a predetermined span of time before the step will be detected in block 506. Such additional requirements may operate to prevent smaller scale events from being detected as shifts from proximity to non-proximity of human body parts (or vice versa). For example, the predetermined magnitude of the step may be such that, if a user's hand is covering the proximity sensor, when the user moves the hand to a position below the sensor, but implementations may determine that the change in the proximity reading is not significant enough to signify the movement of a human body part out of the established proximity range in which transmission power is to be limited and as such the downward step in the measurement would be insufficient to qualify as the detected step in the proximity reading. Other measurements of the magnitude of the step may be used as well.

At 508, upon detecting the step in the proximity sensor readings, the transmission power manager 310 shifts its operation to allow higher transmission power levels than the low power state. Further, the transmission power manager 310 allows the use of a comparison of the current proximity sensor readings with proximity sensor reading thresholds to resume. In some implementations, the transmission power manager 310 may also cause the proximity sensor reading thresholds to be revised or completely reset based on various aspects of the detected step in the proximity sensor readings as well as based on the proximity sensor readings obtained prior to the detected step. For example, if a large negative step is detected which is still insufficient to lower the proximity reading to a level under the threshold that was in use previously, the transmission power manager 310 may determine that the environmental conditions have changed significantly enough to require a complete redetermination of the proximity threshold. Alternatively, rather than selectively resetting the thresholds, other implementations may reset the thresholds at initialization. Still further implementations may use or selectively use the recent proximity readings, the detected step, and the previously established thresholds to determine the new proximity sensor thresholds. As discussed above, the function of comparing the current proximity sensor readings with proximity sensor reading thresholds may be conducted by the transmission power manager 310 at various locations shown in FIG. 3 or the proximity sensor 322 may perform this function. In some implementations, the determination of the new or revised threshold can be performed using known techniques that would be apparent to one of ordinary skill in the art in view of this disclosure. Such techniques may include linear regression and curve fit techniques.

Illustrative Proximity Data

Figure 6:
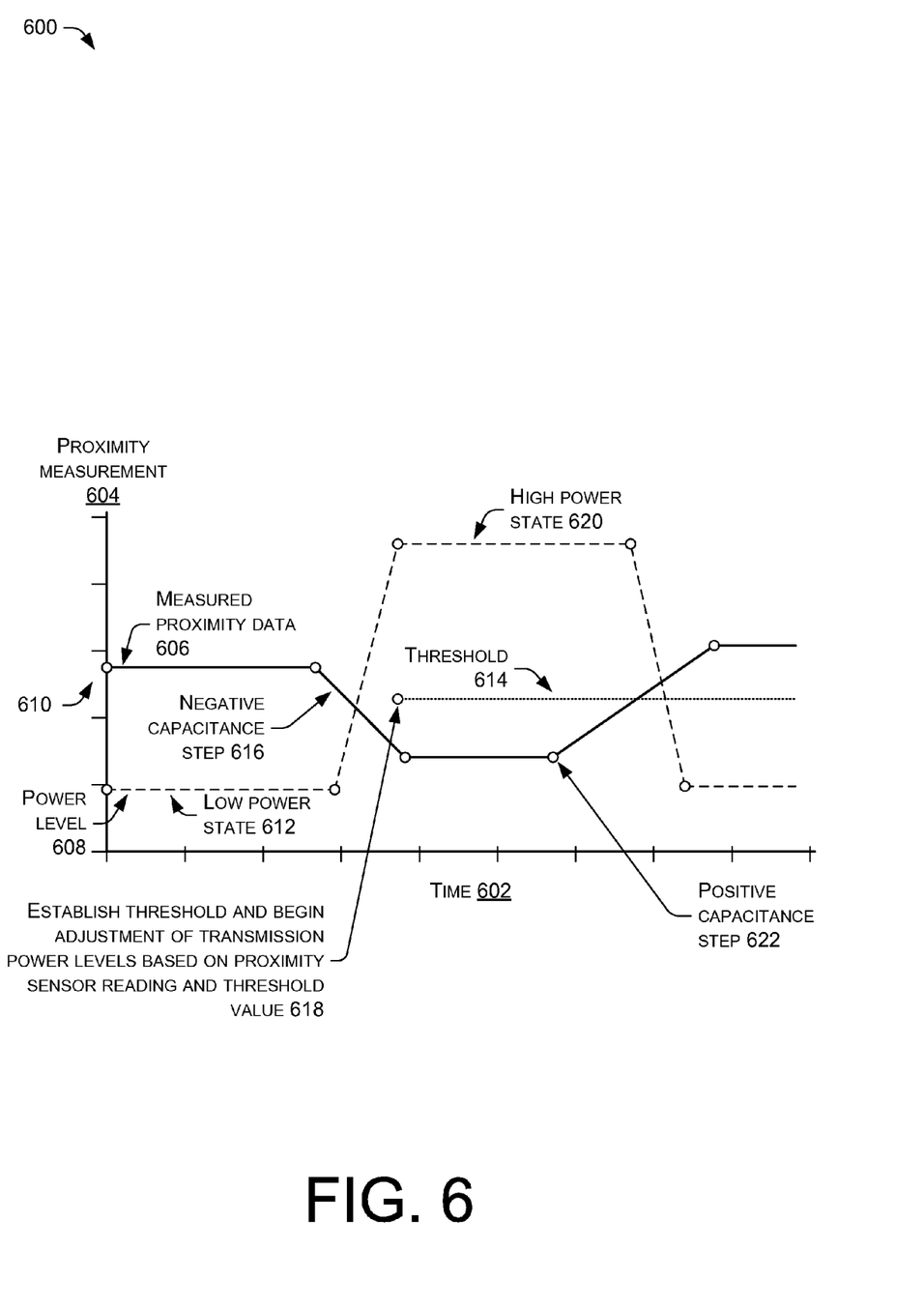
FIGS. 6 and 7 are graphs of illustrative proximity data and power levels with respect to time according to some implementations.

FIG. 6 is a graph of illustrative data 600 of an implementation operating in accordance with the process shown in FIG. 5. Specifically, the graph 600 is a plot of data with respect to time 602 and the proximity measurement 604 which may be based on a change in capacitance, distance, or another measurement (plotted as a solid line indicated as measured proximity data 606). The measured proximity data 606 is described as capacitance data for illustrative purposes and may be obtained by the proximity sensors 412 of FIG. 4.

The graph 600 also includes a plot of the relative transmission power level 608 that corresponds in time with the measured proximity data 606 and shows the relative increase and decrease of the transmission power level performed based on the measured proximity data 606. In some implementations, the plotting of the particular timing correlation between the transmission power level 608 and the measured proximity data 606 is purely for illustration and is not limiting. For ease of comprehension, FIGS. 6, 7, 9, and 10 assume that other portions of the user device that may affect the transmission power level request the highest transmission power level allowed by the transmission power manager. In other words, in some examples, the power level (e.g. 608) could also be referred to as the highest power state "allowed" by the transmission power manager.

Initially, the user device 300 is initialized at the point indicated by item 610 in a mode which limits the transmission power level 608 to the low power state 612 without regard to the comparison of the measured proximity data 606 to a threshold, such as threshold 614. Instead, the transmission power manager 310 maintains the low power state 612 until it detects a negative capacitance step 616.

At the point indicated by item 618, in response to detecting the negative capacitance step 616 in the measured proximity data 606, the transmission power manager 310 changes the transmission power level 608 to a high power state 620, establishes a proximity sensor threshold 614 based on recent and current proximity measurement data 606, and begins the using a comparison of the measured proximity data 606 to the threshold 614 to adjust the transmission power level 608. For example, at the point indicated by item 622, a positive capacitance step occurs which causes the measured proximity data 606 to exceed the threshold 614. In response, the transmission power manager 310 reduces the transmission power level 608 back to the low power state 612.

Figure 7:
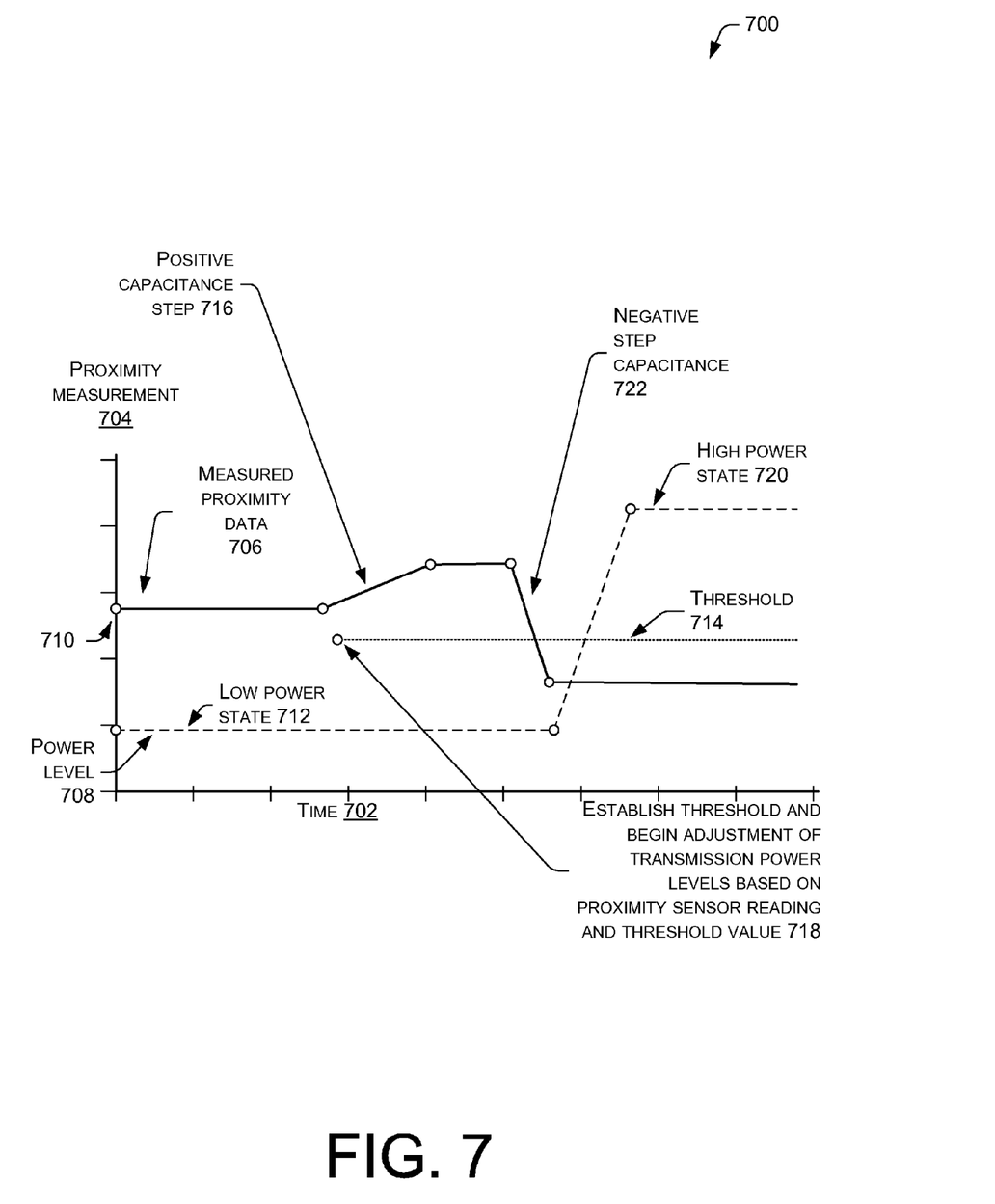

FIG. 7 is a second graph of illustrative data 700 of an implementation operating in accordance with the process shown in FIG. 5. Specifically, the graph 700 is a plot of data with respect to time 702 and the proximity measurement 704 which may be based on a change in capacitance, distance, or another measurement (plotted as a solid line indicated as measured proximity data 706). The graph 700 also includes a plot of the relative transmission power level 708 that corresponds in time with the measured proximity data 706 and shows the relative increase and decrease of the transmission power level performed based on the measured proximity data 706. However, graph 700 differs from graph 600 in that the first detected capacitance step is a positive capacitance step.

Initially, the user device 300 is initialized at the point indicated by item 710 in a mode which limits the transmission power level 708 to the low power state 712 without regard to the comparison of the measured proximity data 706 to a threshold such as threshold 714. Instead, the transmission power manager 310 maintains the low power state 712 until it detects a capacitance step.

At the point indicated by item 718, in response to detecting the positive capacitance step 716 in the measured proximity data 706, the transmission power manager 310 establishes a proximity sensor threshold 714 based on recent and current proximity measurement data 706, begins the using a comparison of the measured proximity data to the threshold 714 to adjust the transmission power level 708, but maintains the transmission power level 708 to the low power state 712. Specifically, the increase in the capacitance indicates that, prior to the positive capacitance step 716, the user device 300 was not in close proximity with a human body part and has now moved into proximity. Thus, the transmission power level 708 must remain at the low power state 712 at this point. As such, the transmission power level 708 is only changed to the high power state 720 when a negative capacitance step 722, causes the measured proximity data 706 to fall below the threshold 714.

Figure 8:
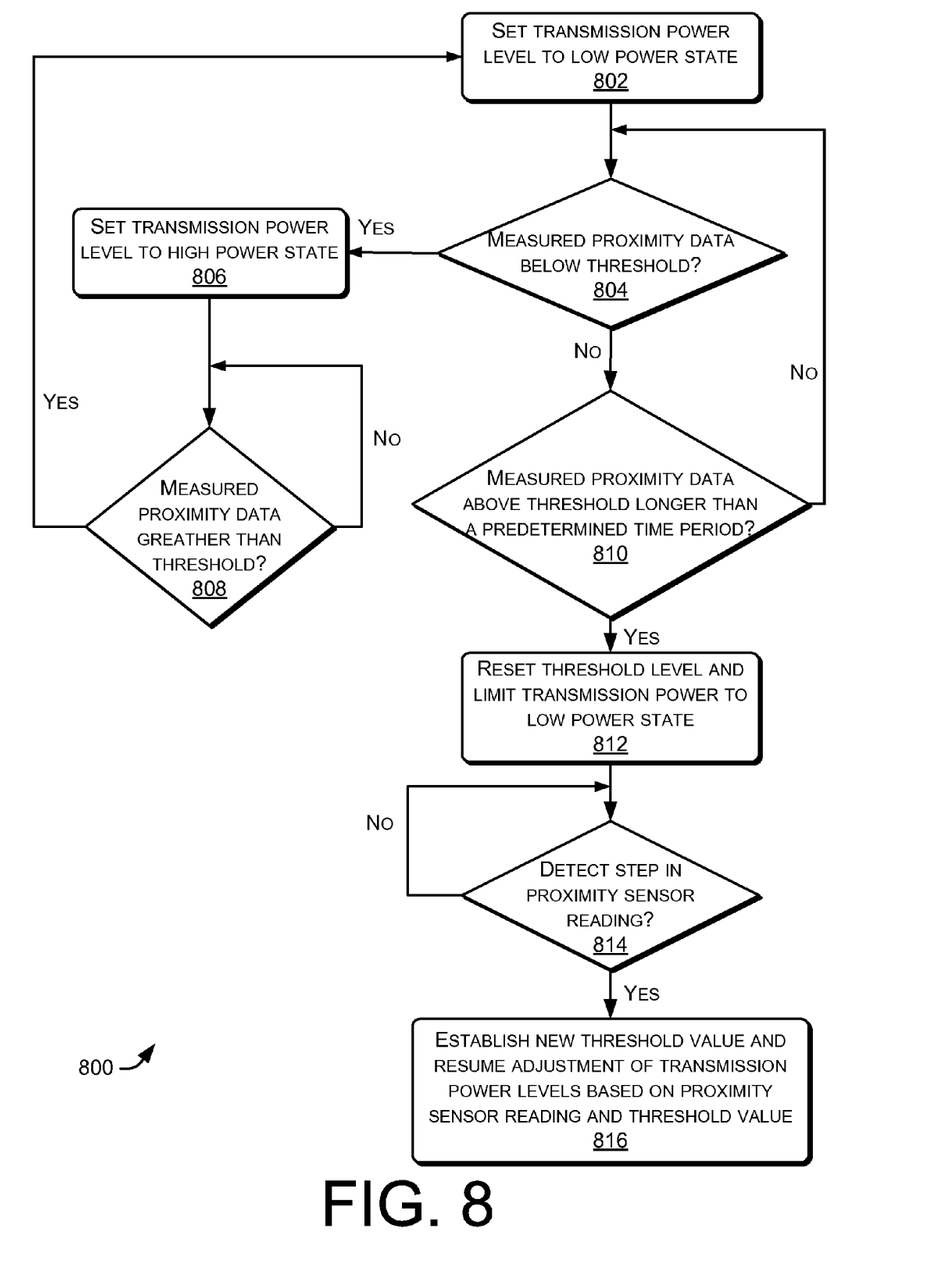
FIG. 8 is a flow diagram of an illustrative process for controlling a wireless transceiver power level during operation of a user device.

FIG. 8 is a flow diagram of an illustrative process 800 that shows one example implementation for calibrating the use of the proximity sensors based on various changing environmental conditions that require the threshold to be adjusted during operation, and in particular, for handling sudden environmental changes. An example of such a sudden environmental change is the attachment of a cover to the user device 300 during operation that causes a distortion of the proximity sensor readings relative to the proximity sensor readings prior to the attachment of the cover. Thus, the current threshold, which was determined based on readings taken prior to the attachment of the cover, is scaled for lower capacitance levels (assuming the proximity sensor is a capacitive sensor), and thus, unless adjusted for, the attachment of the cover will result in the transmission power manager 310 maintaining the device in the low transmission power state. The process illustrated in FIG. 8 operates by detecting if the proximity sensor readings continuously indicate that the device is in proximity for more than a predetermined amount of time, and if so, it operates to reset the proximity sensor operation in a similar manner to that discussed above regarding FIG. 5. The description below of the process 800 will begin the instant after a determination that the measured proximity data is greater than the threshold.

At 802, in response to a determination that the measured proximity data is greater than the threshold, the transmission power manager 310 operates to set the transmission power to the low power state.

At 804, the transmission power manager 310 determines whether the current measured proximity data has dropped below the threshold. If so, the process flow moves to blocks 806 and 808. Otherwise, the process continues to block 810.

At 806, in response to the determination that the current measured proximity data has dropped below the threshold, the transmission power level is set to the high power state. At 810, the transmission power manager 310 determines if the measured proximity data has increased to above the threshold. If so, the process returns to block 802. Otherwise, the process repeats block 808 for each subsequent measurement until the transmission power manager 310 determines that the measured proximity data has increased to above the threshold.

Returning to block 804, as stated above, if the transmission power manager 310 determines that the current measured proximity data has not dropped below the threshold, the process continues to block 810. At block 810, the transmission power manager 310 determines whether the measured proximity data has been above the threshold for longer than a predetermined time period. If not, the process returns to block 804. If so, the process continues to block 812 which begins a process similar to that discussed above regarding FIG. 5.

Specifically, at 812, the transmission power manager 310 resets the threshold value and limits the transmission power level to the low power state. The process then continues to block 814.

At 814, the transmission power manager 310 monitors the proximity sensor readings, in this case, capacitance sensor data, to detect a step in the sensed capacitance readings in the manner described above regarding block 506 of FIG. 5. Upon detection of a step in the capacitance readings, the process then continues to block 816. As with block 506 of FIG. 5, some implementations of block 814 may monitor for only upward or downward steps in the proximity sensor readings. For example, in the case of attempting to compensate for the attachment of a cover to the user device 300, a downward step only implementation of block 814 suffices.

At 816, the transmission power manager 310 establishes a new threshold value and resumes the adjustment of transmission power levels based on proximity sensor reading and new threshold value at either block 802 or 806, as appropriate, based on whether or not the proximity sensor readings are greater than the new threshold value. For example, if, after the new threshold is determined, the next proximity sensor reading is less than the new threshold, the process will return to block 806, set the transmission power level to the high power state, and so on.

The process shown in FIG. 8 may be generalized in various ways. For example, in an implementations that is also intended to compensate for a shifting of subsequent readings to lower levels, such as the removal of a cover from the user device 300, an additional step may determine if the measured proximity data has been below the threshold for longer than the predetermined time, and if so, direct the process flow from block 808 to block 812. In a further alternative implementation, blocks 810-816 may have matching blocks attached to block 808 rather than being shared between blocks 804 and 808.

Figure 9:
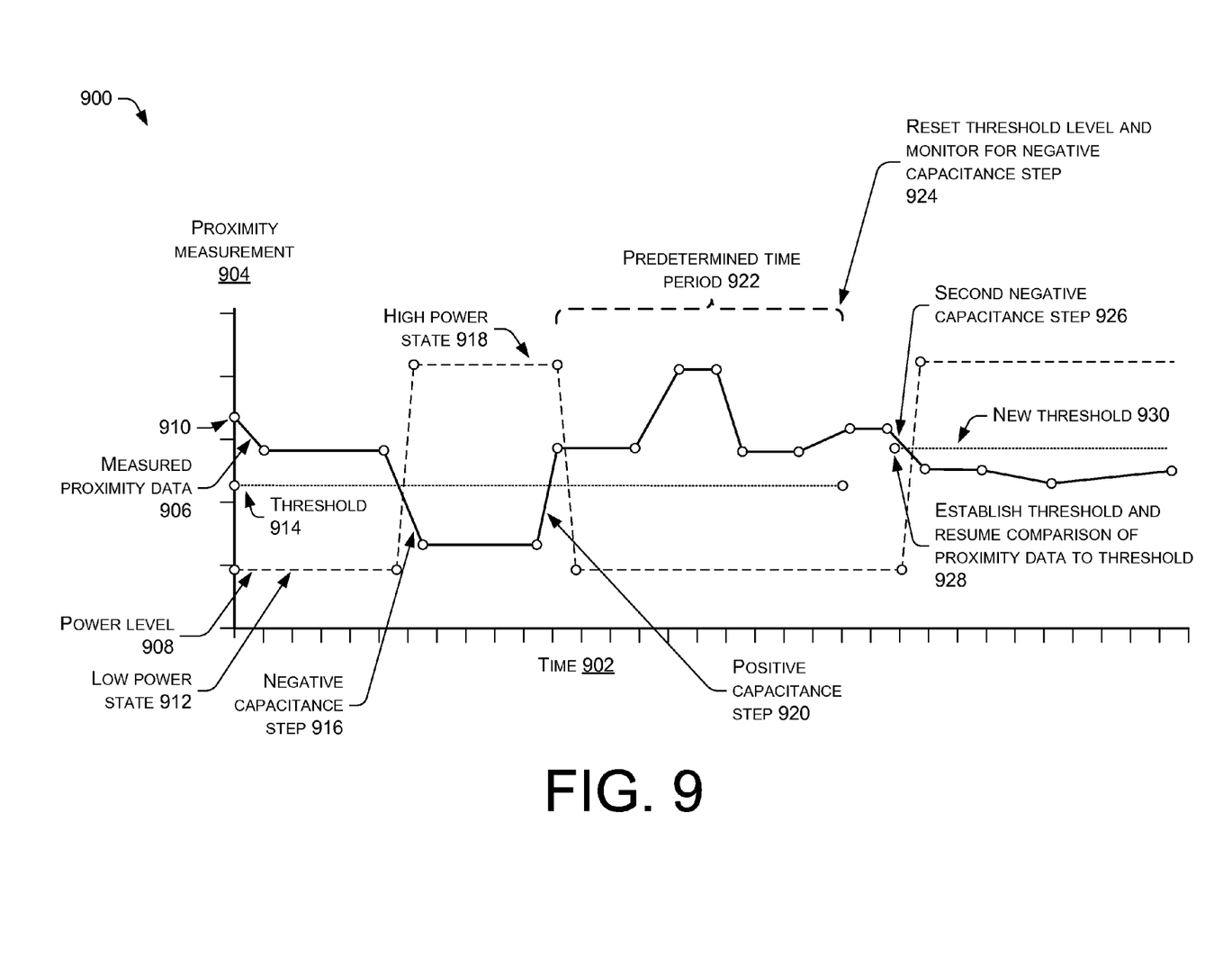
FIG. 9 is a graph of illustrative proximity data and power levels with respect to time according to some implementations.

FIG. 9 is a graph of illustrative data 900 of an implementation operating in accordance with the process shown in FIG. 8. Specifically, the graph 900 is a plot of data with respect to time 902 and the proximity measurement 904 which may be based on a change in capacitance, distance, or another measurement (plotted as a solid line indicated as measured proximity data 906). The measured proximity data 906 is described as capacitance data for illustrative purposes and may be obtained by the proximity sensors 412 of FIG. 4.

The graph 900 also includes a plot of the relative transmission power level 908 that corresponds in time with the measured proximity data 906 and shows the relative increase and decrease of the transmission power level performed based on the measured proximity data 906.

The data shown on the graph 900 begins at the point indicated by item 910 which occurs shortly after block 802 of FIG. 8. Specifically, point 910 occurs shortly after the power level 908 has been reduced to the low power state 912 following the measured proximity data 906 rising above the threshold 914 (not shown).

Next, the flow loops through blocks 804 and 810 repeatedly until the occurrence of a negative capacitance step 916 that lowers the measured proximity data 906 to a level below the threshold. The process then continues in block 806 at which time the transmission power level is set to the high power state 918.

The process flow moves to block 808 where it remains until the occurrence of a positive capacitance step 920 that raise the measured proximity data 906 to a level above the threshold 914. The process flow then continues to block 802 in which the transmission power level is set to the low power state 908.

The flow again loops through blocks 804 and 810 repeatedly but, in this case, no negative capacitance step that lowers the measured proximity data 906 to a level below the threshold 914 occurs during the predetermined time period 922. At the end of the predetermined time period 922, the process flow continues to block 812.

At the point indicated as item 924, the threshold level 914 is reset (i.e. removed) and the transmission power level 906 remains at and is limited to the low power state 908. The process then continues to block 814.

Block 814 monitors the proximity sensor readings until a negative capacitance step is detected. In FIG. 9, the next negative capacitance step is the second negative capacitance step 926. Upon detection of the second negative capacitance step 926, the process then continues to block 816.

At the point indicated as item 928 in FIG. 9, a new threshold 930 is established and the user device 300 resumes the adjustment of transmission power levels based on proximity sensor reading and new threshold value 930 at either block 802 or 806 as appropriate. Based on the data shown in graph 900, the process flow returns to block 806 where the transmission power level 908 is set to the high power state 918.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:
1. A user device, comprising:
one or more processors;
a wireless transceiver under control of the one or more processors and to communicate wirelessly with another device;
a proximity sensor, under control of the one or more processors, to obtain proximity data over time indicative of a proximity between the user device and a human body; and
one or more computer-readable media maintaining a transmission power manager executable by the one or more processors to, in response to at least one of a power up of the user device or an initialization of the wireless transceiver:
restrict a transmission power level of the wireless transceiver to a first power state of a plurality of power states, wherein the first power state is a lower power state relative to at least one other power state of the plurality of power states;
determine a proximity data threshold based on an analysis of proximity data obtained by the proximity sensor over a first period of time, the proximity data threshold being determined at a time after the transmission power level is restricted to the first power state;
compare the proximity data threshold to proximity data obtained by the proximity sensor over a second period of time, the second period of time being different from the first period of time;
determine that the proximity data obtained by the proximity sensor over the second period of time at least reaches the proximity data threshold; and
increase the transmission power level of the wireless transceiver to a second power state of the plurality of power states based at least in part on the proximity data obtained by the proximity sensor over the second period of time at least reaching the proximity data threshold, wherein the second power state is a higher power state relative to the first power state.

2. The user device as recited in claim 1, wherein the transmission power manager determines the proximity data threshold in response to the proximity sensor obtaining proximity sensor data indicative of a change in the proximity between the user device and the human body.

3. The user device as recited in claim 1, wherein the proximity data threshold is a first proximity data threshold, and wherein the transmission power manager is further configured to:
  determine, at a time after the first proximity data threshold is determined, a second proximity data threshold to replace the first proximity data threshold; and
  compare the second proximity data threshold to proximity data obtained by the proximity sensor over a third period of time.

4. The user device as recited in claim 3, wherein the transmission power manager determines the second proximity data threshold based at least in part upon a determining that the proximity data obtained by the proximity sensor over the second period of time has remained one of greater than or lesser than the first proximity data threshold for a predetermined period of time.

5. The user device as recited in claim 4, wherein the second proximity data threshold is determined based at least in part upon a value of the proximity data exceeding the first proximity data threshold for a predetermined period of time.

6. The user device as recited in claim 1, wherein the proximity data threshold is unique to the user device.

7. The user device as recited in claim 1, wherein the transmission power manager restricts the transmission power level of the wireless transceiver to the first power state upon an initialization of the user device.

8. A user device comprising:
  one or more processors;
  a wireless transceiver to communicate wirelessly with another device;
  a proximity sensor to obtain proximity data over time indicative of a proximity between the user device and an object,
  one or more computer-readable media maintaining a transmission power manager executable by the one or more processors to perform acts including:
    restricting a transmission power level of the wireless transceiver to a first power state of a plurality of power states, wherein the first power state is a lower power state relative to at least one other power state of the plurality of power states;
    determining, based on an analysis of the proximity data obtained over a first period of time, a proximity data threshold, wherein the proximity data threshold is determined at a time after the transmission power level is restricted to the first power state;
    comparing the proximity data threshold to proximity data obtained by the proximity sensor over a second period of time;
    determining that the proximity data obtained by the proximity sensor over the second period of time at least reaches the proximity data threshold; and
    increasing the transmission power level of the wireless transceiver to a second power state of the plurality of power states based at least in part on the proximity data obtained by the proximity sensor over the second period of time at least reaching the proximity data threshold, wherein the second power state is a higher power state relative to the first power state.

9. The user device as recited in claim 8, wherein the proximity data threshold is determined in response to the proximity sensor obtaining proximity data indicative of a change in the proximity between the user device and the object.

10. The user device as recited in claim 9, wherein the change in the proximity between the user device and the object is of at least a predetermined magnitude.

11. The user device as recited in claim 9, wherein the change in the proximity between the user device and the object is a change of at least a predetermined magnitude occurring within a predetermined amount of time.

12. The user device as recited in claim 9, wherein the proximity sensor is a capacitive sensor and wherein the proximity data indicative of a change in the proximity between the user device and the object is a change in capacitance detected by the proximity sensor.

13. The user device as recited in claim 8, wherein the proximity data threshold is determined based at least in part on proximity data obtained during a time period prior to the proximity sensor obtaining proximity data indicative of a change in the proximity of the user device to the object.

14. The user device as recited in claim 8, wherein the proximity sensor:
  compares the proximity data obtained by the proximity sensor over the second period of time to a plurality of determined proximity data thresholds, the plurality of determined proximity data thresholds comprising the proximity data threshold, each proximity data threshold of the plurality of determined proximity data thresholds being associated with a different power state of the plurality of power states; and
  outputs a signal to set the transmission power level of the wireless transceiver to one of the plurality of power states based at least in part on the comparison.

15. The user device as recited in claim 14, wherein the transmission power manager, when not restricting the transmission power level of the wireless transceiver, controls the transmission power level of the wireless transceiver based on the signal.

16. The user device as recited in claim 8, wherein the proximity data threshold is a first proximity data threshold; and
  wherein the transmission power manager performs acts including,
    determining, in response to detecting that the transmission power level of the wireless transceiver remains in one of the plurality of power states for a predetermined period of time, a second proximity data threshold based at least in part on recent and current proximity data, and
    replacing the first proximity data threshold with the second proximity data threshold.

17. The user device as recited in claim 8, wherein the object is a human body.

18. The user device as recited in claim 8, wherein the transmission power manager performs the acts of restricting, detecting and increasing in response to at least one of a power up of the user device or an initialization of the wireless transceiver.

19. The user device as recited in claim 8, wherein the acts further comprise;
  modifying the proximity data threshold based at least in part on proximity data obtained during a time period after increasing the transmission power level of the wireless transceiver.

20. A method comprising:
  under control of a user device configured with executable instructions, restricting a transmission power level of a wireless transceiver to one of a plurality of power states that is a lower power state relative to at least one of the other power states;

detecting a change in a proximity between the user device and a human body based upon capacitance sensor data obtained by a capacitive proximity sensor of the user device;

in response to detecting the change in the proximity, determining a capacitance data threshold based on an analysis of the capacitance sensor data obtained over a first period of time;

comparing the capacitance data threshold to capacitance sensor data obtained by the capacitive proximity sensor over a second period of time, the second period of time being different from the first period of time;

determining that the capacitance sensor data obtained by the proximity sensor over the second period of time at least reaches the capacitance data threshold; and based on the capacitance sensor data obtained by the proximity sensor over the second period of time at least reaching the capacitance data threshold, changing the transmission power level of the wireless transceiver to a higher power state.

21. The method as recited in claim 20, further comprising:
modifying the capacitance data threshold based at least in part on capacitance sensor data obtained during a time period after the changing of the transmission power level of the wireless transceiver to a higher power.

22. The method as recited in claim 20, wherein the detected change in the proximity between the user device and the human body is of at least a predetermined magnitude.

23. The method as recited in claim 20, wherein the wireless transceiver is at least one of a mobile telephone wireless transceiver or a Wi-Fi transceiver.

24. The method as recited in claim 20, wherein the acts of restricting, detecting and changing are performed in response to at least one of a power up of the user device or an initialization of a wireless transceiver.

25. The method as recited in claim 20, wherein the capacitance data threshold is a first capacitance data threshold, the method further comprising:

based at least in part on detecting that the transmission power level of the wireless transceiver has remained in one of the plurality of power states for a predetermined period of time:
restricting the transmission power level of the wireless transceiver to one of the plurality of power states that is a lower power state relative to at least one of the other power states;
at a time after restricting the transmission power level, detecting a change in the proximity between the user device and a human body; and
upon detecting the change in the proximity, determining a second capacitance data threshold and replacing the first capacitance data threshold with the second capacitance data threshold.

26. A method comprising:
under control of a user device configured with executable instructions,
detecting that a transmission power level of a wireless transceiver of the user device remains in one of a plurality of power states for a predetermined period of time; and in response to detecting that the transmission power level of the wireless transceiver remains in one of the plurality of power states for the predetermined period of time:
restricting a transmission power level of the wireless transceiver to one of a plurality of power states;
detecting a change in proximity between the user device and a human body;
in response to detecting the change in proximity, determining a proximity data threshold based on an analysis of the proximity data obtained over a first period of time; and
increasing the transmission power level of the wireless transceiver to a higher power state of the plurality of power states based at least in part on a comparison of the proximity data threshold to proximity data obtained by the proximity sensor over a second period of time.

27. The method as recited in claim 26, wherein the acts performed in response to detecting that the transmission power level of the wireless transceiver remains in one of the plurality of power states for the predetermined period of time further comprise:
determining that the proximity data obtained by the proximity sensor over the second period of time is less than the proximity data threshold; and
in response to the proximity data obtained by the proximity sensor over the second period of time being less than the proximity data threshold, restricting the transmission power level to one of a plurality of power states having a transmission power level lower than a current transmission power level.

28. The method as recited in claim 26, wherein the proximity data threshold is a first proximity data threshold, and wherein the acts further comprise determining a second proximity data threshold, and replacing the first proximity data threshold with the second proximity data threshold.

29. The method as recited in claim 26, wherein the detected change in proximity is a change of at least a predetermined magnitude.

30. The method as recited in claim 26, wherein the proximity data threshold is a first proximity data threshold, and further comprising:
determining, based on proximity data obtained by the proximity sensor over a third period of time, that the proximity data obtained by the proximity sensor over a third period of time has remained greater than the first proximity data threshold for the predetermined time period; and
replacing the first proximity data threshold with a second proximity data threshold, wherein the second proximity data threshold is determined based at least in part on proximity data obtained after stopping the restricting of the transmission power level.

* * * * *